Patented Mar. 1, 1938

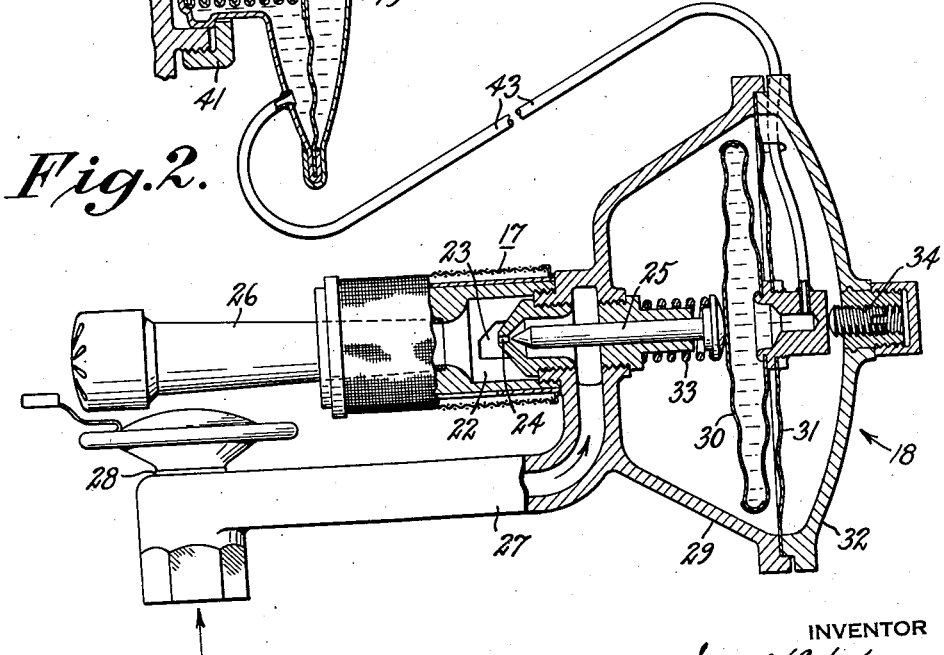

2,109,607

UNITED STATES PATENT OFFICE 2,109,607

REFRIGERATION

Sven W. E. Andersson, Evansville, Ind., assignor to Servel, Inc., New York, N. Y., a corporation of Delaware Application January 23, 1936, Serial No. 60,413

9 Claims. (Cl. 62—5)

My invention relates to refrigeration and more particularly to regulation of refrigeration apparatus responsive to temperature.

It is an object of my invention to provide an improved arrangement for transmission of thermostatic impulses. Another object is to provide an improved adjustment for refrigerator regulators whereby adjustment may be had at a convenient remote point and also whereby an abnormal adjustment may be made to provide for defrosting of the refrigerator, which abnormal adjustment is automatically terminated responsive to rise in temperature.

I provide a thermostat adjustment including a load spring, normal adjusting means for varying the tension of the load spring, and means for exerting an abnormal tension on the load spring including means for detaining the abnormal adjustment in operative position until abnormal operation of the thermostat. I also provide for hydraulic connection between such adjustment means and the thermostat and further provide an improved arrangement for hydraulic transmission of impulse from a thermostat to a control device whereby the impulse direction is reversed.

My invention, together with the objects and advantages thereof, will be more fully understood upon reference to the following description and accompanying drawings forming part of this specification, and of which:

Fig. 2 is a detail view, with parts shown in section, of a regulator for the refrigerator shown in Fig. 1; and Fig. 3 is a detail view, partly in section, illustrating a modification of a portion of the regulator shown in Fig. 2.

Figure 1:
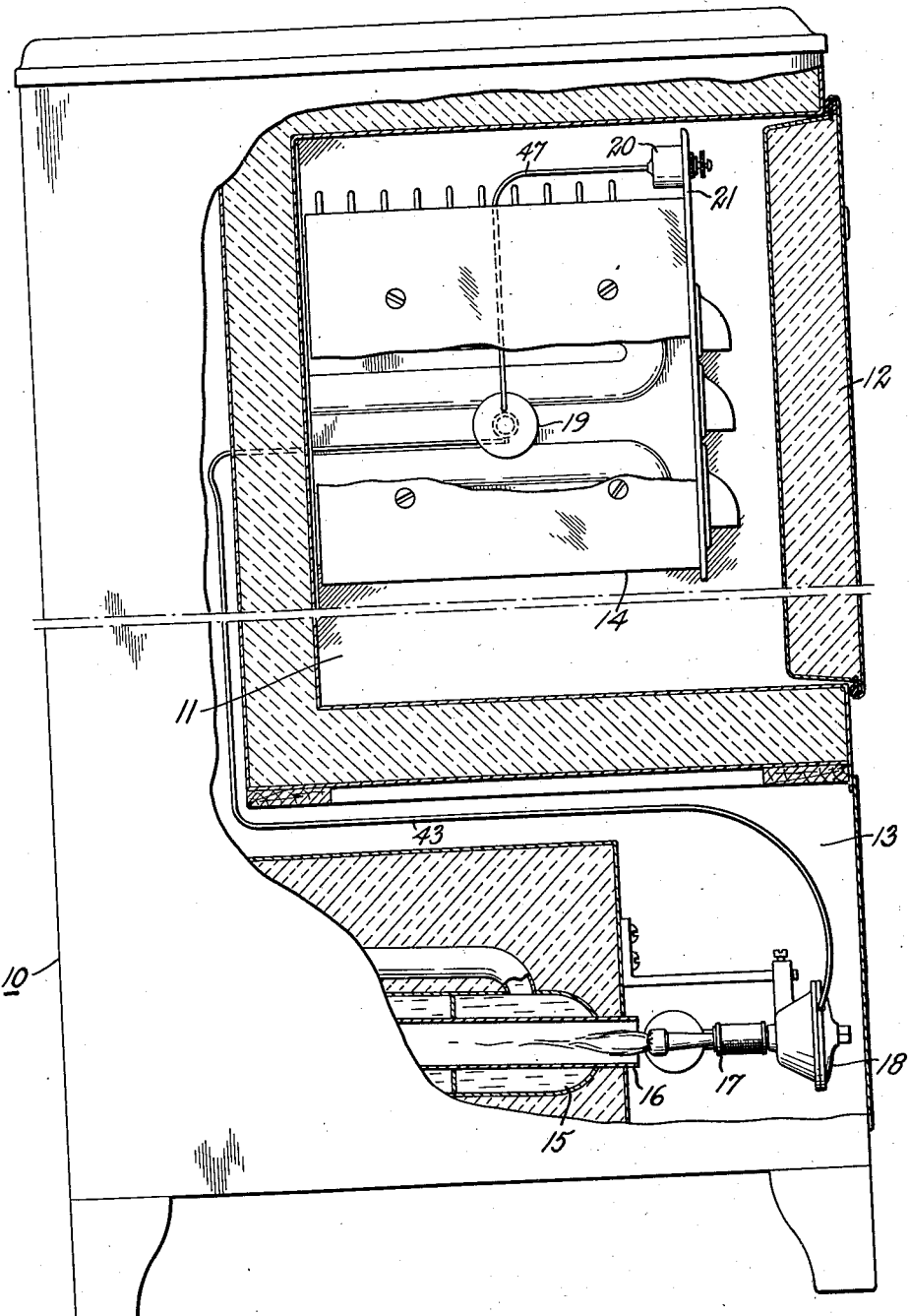
Fig. 1 is a side elevation, with parts broken away, of a refrigerator embodying the invention.

Referring to Fig. 1, I have illustrated the invention in connection with a refrigerator having an absorption refrigeration apparatus of a uniform pressure type. The refrigerator is generally indicated by the reference character 10 and comprises a cabinet having a thermally insulated storage compartment 11 accessible by means of a door 12, and an apparatus compartment 13 beneath and in the rear of the storage compartment. The refrigeration apparatus is located in the cabinet with an evaporator or cooling element 14 in the storage compartment 11 and the other parts of the apparatus including a generator 15 located in the apparatus compartment 13. Only those parts of the apparatus necessary for description of this invention are shown. Briefly, however, in refrigeration apparatus of this type refrigerant fluid is expelled from absorption liquid by heating in a part referred to as a generator. The expelled refrigerant vapor is liquefied in the condenser and the liquid conducted into an evaporator where it evaporates and diffuses into an inert gas. The resulting gas mixture is conducted to an absorber in which the refrigerant vapor is absorbed out of the gas into weakened absorption liquid. Absorption liquid is circulated between the generator and absorber, and the inert gas is circulated between the evaporator and absorber.

The generator 15 is heated by means of a flue 16 into one end of which is directed the flame of a gas burner 17. The gas burner 17 is controlled by a device 18 which is regulated by a thermostatic device 19 on the cooling element 14, and the thermostatic device 19 is adjustable by a device 20 located on a front plate 21 of the cooling element 14.

I will now describe the several devices 18, 19, and 20, making more particular reference to Fig. 2. The burner 17 is of a known type comprising a mixing chamber 22 having air inlet ports 23 and a gas inlet opening 24 controlled by a needle valve 25. A burner tube 26 extends from the mixing chamber 22 and the gas inlet conduit 27 extends adjacent the head of the burner tube 26 where it is provided with a safety valve 28 of a known type which cuts off flow of gas to the burner when the flame is extinguished.

The burner control device, generally indicated by the reference numeral 18, is housed in a casing 29 which may be formed as part of the burner casing. In the casing 29 is arranged an expansible wafer or like member 30 which is mounted on a resilient diaphragm 31 secured peripherally between the edge of the casing 29 and its cover portion 32. The burner valve needle 25 is arranged in operative relation with the expansible member 30, the valve needle being loaded against the expansible member by means of a coil spring 33. A suitable screw 34 in the cover plate 32 provides for adjusting the position of the resilient diaphragm 31 and the expansible member 30 mounted thereon.

On the evaporator 14 is mounted the previously mentioned thermostatic device generally indicated by the reference numeral 19. This device comprises a casing 35 having a cover plate 36. A resilient diaphragm 37 is secured peripherally between the casing 35 and its cover 36. There is thus formed a chamber 38 on one side of the diaphragm 37, and a chamber 39 on the other side of the diaphragm. In chamber 38 is located an expansible cartridge 40 containing a suitable expansible fluid such as propane, methyl chloride, or the like. One end of the cartridge 40 is connected to the center of the diaphragm 37 so that the latter is flexed outwardly with respect to chamber 38 upon expansion of the cartridge and inwardly upon contraction thereof. The other end of the cartridge 40 is arranged so that it may be brought into good thermal contact with the evaporator 14. This has been accomplished in the embodiment illustrated by extending this end of the cartridge 40 through an opening in the casing 35 and sealing the joint thus made. The casing 35 is formed so that the protruding end of the cartridge 40 may be held in thermal contact with the evaporator 14 by means of a retaining nut 41 threaded onto a hollow boss 42 on the wall of the evaporator 14. The chamber 38 in the thermostatic device 19 is connected by means of a capillary tube 43 to the expansible member 30 of the control device 18. The expansible member 30, the capillary tube 43, and the chamber 38 constitute a fluid tight chamber having one flexible wall portion formed by the diaphragm 37 and another flexible wall portion formed by the expansible member 30. This fluid tight chamber is filled with a suitable liquid.

It will now be understood that expansion of the thermostat cartridge 40 upon increase in temperature of the cooling element 14 tends to increase the volume of the above described chamber formed by the liquid containing members and that this permits contraction of the expansible wafer 30 so that the needle valve 25 may open under the action of spring 33 to permit greater flow of gas to the burner. Contraction of the cartridge 40 upon decrease in temperature of the cooling element 14 tends to decrease the volume of the hydraulic system, causing expansion of the wafer 30 against the action of spring 33 to move the needle valve 25 toward its closed position and reduce the flow of gas to the burner.

The adjusting device 20 mounted on the front plate 21 of the cooling element, or any other desired place inside or outside the refrigerator, comprises a casing 44 having a flexible wall portion formed by a flexible bellows 45. The chamber 46 within the casing 44 is connected by means of a capillary tube 47 to the chamber 39 on the outside of the diaphragm 37 in the thermostatic device 19. The chambers 39 and 46 and the capillary tube 47 constitute a fluid tight chamber which is also filled with a suitable liquid. Kerosene or other suitable oil may be used. The flexible wall portion formed by the bellows 45 is loaded inwardly by a load spring 48 which is arranged between a boss 49 on the end plate of the bellows 45 and a spring retaining disc 50. The latter is secured on the end of a rod 51 which is slidable in a bushing 52. The latter is threaded into a second bushing 53 which is in turn threaded into a cover plate 54 on the casing 44 over the bellows 45. The bushing 53 is provided with a lock nut 55 so that this bushing may be suitably adjusted for the purpose hereinafter described and then secured in place by tightening the nut 55. The bushing 52 is provided on its outer end with a suitable knob or dial 56 by which the bushing 52 may be turned inwardly and outwardly through the bushing 53. The inner end of the bushing 52 normally provides an abutment for the spring retaining disc 50 so that by turning the bushing 52 the tension of the spring 48 may normally be adjusted.

It will now be understood that increasing the tension on the load spring 48 increases the pressure on liquid in the chamber 46, and that this pressure is transmitted by the liquid to the diaphragm 37 in the thermostatic device 19. The effect is the same as though the load spring 48 and its adjustment were applied directly to the diaphragm 37 as illustrated in the modification of Fig. 3. In this figure it will be seen that the hydraulic system between the load spring 48 and the diaphragm 37 has been omitted. The other parts being the same as in Fig. 2 are identified by the same reference characters.

By turning the normal adjusting knob 56, the effect of the load spring 48 on the thermostatic cartridge 40 may be adjusted so that the burner 17 will be regulated in the manner previously described to maintain a desired constant temperature of the cooling element 14. If this temperature is below the freezing point of water, the cooling element 14 will become covered with frost due to condensation and freezing thereon of water out of the air circulating in the refrigerator storage comparment 11. For reasons of sanitation and thermal efficiency it is desirable to intermittently remove this frost. This may be done by temporarily increasing the temperature of the cooling element 14. It is desirable that instigation of such defrosting be at the will of the user of the refrigerator, but it is inconvenient to return the refrigerator to normal operation after defrosting has been accomplished. I therefore provide means for obtaining an abnormal adjustment of the load spring 48 so that the effect thereof on the thermostatic cartridge 40 will cause operation of the burner 17 at a rate that allows the temperature of the cooling element 14 to rise. I also include means for detaining this abnormal adjustment in operation until abnormal pressure is set up by the thermostatic cartridge 40 against the load spring 48 upon increase in temperature of the cooling element 14, whereupon the abnormal adjustment is automatically returned to its ineffective position. The arrangement is the same in Figs. 2 and 3. The load spring retaining disc 50 is provided with a V-shaped edge and there are mounted on the bushing 53 one or more pairs of spring clips 57 which extend into operative engagement with the edge of the spring retaining disc 50 so that when the disc is moved inwardly by manually or otherwise forcing it past the spring clips 57 it is prevented by the clips from returning to its normal position abutting the inner end of the normal adjusting bushing 52 until the tension of the load spring 48 is sufficiently augmented by the increasing pressure of the thermostatic cartridge 40 upon abnormal rise in temperature of the cooling element 14. The outer end of the rod 51 is provided with a suitable head 58 by which the rod may be pushed inwardly to abnormally displace the spring retaining disc 50 when it is desired to instigate defrosting.

The position of the spring clips 57 may be adjusted by turning the bushing 53 to which they are attached, thereby varying the force necessary to return the spring retaining disc 50 past the clips and therefore the temperature to which the cooling element 14 will rise before automatically returning to normal operation.

It will be understood that various changes and modifications may be made within the scope of the invention as indicated in the following claims.

What is claimed is:

1. A refrigerator including a cooling element, a generator, a gas burner for heating said generator, and a device for regulating said burner responsive to temperature of said cooling element and including an expansible member, a casing having a flexible wall portion, a capillary tube connecting said casing and said expansible member, and an expansible cartridge containing an expansible fluid located in said casing and arranged to flex said wall portion outwardly and inwardly upon expansion and contraction respectively, said casing, capillary tube, and expansible member forming a fluid tight chamber and filled with liquid having a negligible temperature coefficient of expansion, and said cartridge being arranged in thermal conductive relation with said cooling element.

2. A refrigerator including a cooling element, a generator, a heater for said generator, a device for regulating said heater responsive to temperature of said cooling element and including members forming a fluid tight chamber having a plurality of flexible wall portions, an expansible cartridge containing an expansible fluid located in said chamber and arranged to flex one of said wall portions outwardly and inwardly upon expansion and contraction respectively, another of said wall portions being operatively associated with said heater, said cartridge being arranged in thermal conductive relation with said cooling element, and said chamber being filled with a liquid having a negligible temperature coefficient of expansion, whereby expansion of said cartridge upon increase in temperature of said cooling element causes inward flexure of said second wall portion.

3. A refrigerator including a cooling element, a generator, a heater for said generator, and a device for regulating said heater responsive to temperature of said cooling element including an expansible fluid thermostat operative responsive to temperature of said cooling element, and a liquid filled member for hydraulic transmission of impulse from said thermostat to said heater and constructed and arranged so that expansion and contraction of said thermostat tends to cause increase and decrease respectively in volume of said member.

4. A device for regulating operation of a refrigerator responsive to temperature including a thermostat and a liquid filled member for hydraulically transmitting impulses of said thermostat and constructed and arranged so that expansion and contraction of said thermostat upon change in temperature tends to respectively increase and decrease the volume of said member.

5. A refrigerator including a cooling element, a generator, a gas burner for heating said generator, a thermostat for regulating said gas burner responsive to temperature of said cooling element, and a device for adjusting said thermostat including a casing having a flexible wall portion operatively associated with said thermostat, a second casing having a flexible wall portion, a capillary tube connecting said casings and forming therewith a fluid tight chamber, said chamber being filled with a liquid having a negligible temperature coefficient of expansion, a spring arranged to exert force inward on said second wall portion, means for normally adjusting the tension of said spring, and means for adjusting said spring to an abnormal tension and automatically operative to relieve such abnormal tension upon abnormal operation of said thermostat.

6. A refrigerator including a cooling element, a generator, a heater for said generator, a thermostat for regulating said heater responsive to temperature of said cooling element, and a device for adjusting said thermostat including a member filled with liquid and having a plurality of flexible wall portions, one of said wall portions being operatively associated with said thermostat, means for exerting force inward on another of said wall portions and normally adjustable to exert a desired inward force, and means operable to exert an abnormal force inward on said second wall portion and automatically operative to relieve such abnormal force upon abnormal operation of said thermostat.

7. In a refrigerator, a cooling element, a thermostat for regulating operation of the refrigerator responsive to temperature of said cooling element, and a device for adjusting said thermostat including a hydraulic transmission member, means normally adjustable to vary the pressure on liquid in said member, and means operable to exert an abnormal pressure on liquid in said member and automatically operative to relieve such abnormal pressure upon abnormal operation of said thermostat.

8. In a refrigerator having a cooling element and a thermostat for controlling operation of the refrigerator responsive to temperature of the cooling element, a load spring for said thermostat, normal adjusting means for varying the tension of said load spring, and auxiliary means operable to exert an abnormal tension on said load spring and including a spring clip for detaining said auxiliary means in its operative position and adapted to be automatcally displaced upon abnormal operation of said thermostat to relieve said abnormal tension.

9. In a refrigerator having a cooling element and a thermostat for controlling operation of the refrigerator responsive to temperature of the cooling element, a load spring for said thermostat, normal adjusting means for varying the tension of said load spring, and auxiliary means operable to exert an abnormal tension on said load spring and including means for detaining said auxiliary means in its operative position and adapted to be automatically displaced upon abnormal operation of said thermostat to relieve said abnormal tension.

SVEN W. E. ANDERSSON.